US012775669B2

(12) United States Patent
Nagarajan et al.

(10) Patent No.: US 12,775,669 B2
(45) Date of Patent: Oct. 27, 2026

(54) LOCALIZED RECOMMENDATION SYSTEMS BASED ON DISCOVERY RADIUS OPTIMIZATION

(71) Applicant: Renyooit LLC, Pleasanton, CA (US)

(72) Inventors: Lakshmi Nagarajan, San Ramon, CA (US); Raja Nagarajan, San Ramon, CA (US); Raghushri Sankaran, West Windsor, NJ (US)

(73) Assignee: Renyooit LLC, Pleasanton, CA (US)

( * ) Notice: Subject to any disclaimer, the term of this patent is extended or adjusted under 35 U.S.C. 154(b) by 0 days.

(21) Appl. No.: 18/816,221

(22) Filed: Aug. 27, 2024

(65) Prior Publication Data

US 2025/0077598 A1 Mar. 6, 2025

Related U.S. Application Data

(60) Provisional application No. 63/579,192, filed on Aug. 28, 2023.

(51) Int. Cl.
*G06F 16/9537* (2019.01)
*G06F 3/0484* (2022.01)
*G06F 16/9535* (2019.01)

(52) U.S. Cl.
CPC ........ *G06F 16/9537* (2019.01); *G06F 3/0484* (2013.01); *G06F 16/9535* (2019.01)

(58) Field of Classification Search
CPC ............... G06F 16/9537; G06F 3/0484; G06F 16/9535; G06F 3/04842; G06F 3/04845; G06F 16/29; G01C 21/3682
See application file for complete search history.

(56) References Cited

U.S. PATENT DOCUMENTS 7,783,621 B2 * 8/2010 Cooper .................. G06F 16/29 707/769
9,609,620 B1 * 3/2017 Bitra ..................... H04W 64/00
(Continued)

OTHER PUBLICATIONS

"Haversine formula," Wikipedia, https://en.wikipedia.org/w/index.php?title=Haversine_formula&oldid=1235273703, 2024, 6 pages.
(Continued)

*Primary Examiner* — Apu M Mofiz
*Assistant Examiner* — Oscar Wehovz
(74) *Attorney, Agent, or Firm* — McDonnell Boehnen Hulbert & Berghoff LLP

(57) ABSTRACT

An example method for a localized recommendation search based on discovery radius optimization is provided. The method involves displaying a map image of a geographical area. The method also involves receiving, from a user, a search query. The method further involves querying, based on the search query, a centralized database, wherein the centralized database comprises data indicative of a plurality of tiles covering the geographical area, wherein each tile of the plurality of tiles is associated with a respective list of points of interest associated with locations within the tile, and wherein the centralized database is configured to determine a particular tile associated with the search query. The method additionally involves receiving, from the centralized database, a particular list of points of interest associated with locations within the particular tile. The method also involves displaying a visual representation of the particular list of points of interest.

20 Claims, 12 Drawing Sheets

(56) References Cited

U.S. PATENT DOCUMENTS

| | | | | |
|---|---|---|---|---|
| 2012/0158762 | A1* | 6/2012 | Iwuchukwu | G06F 16/29 707/E17.014 |
| 2015/0067032 | A1* | 3/2015 | Djabarov | H04W 4/021 709/203 |
| 2016/0295379 | A1* | 10/2016 | Jakatdar | H04L 67/1001 |
| 2017/0223504 | A1* | 8/2017 | Miller | G01C 21/3679 |
| 2019/0347851 | A1* | 11/2019 | Kwant | G06T 17/20 |

OTHER PUBLICATIONS

"OpenStreetMap," Wikipedia, https://en.wikipedia.org/w/index.php?title=OpenStreetMap*&oldid=1240279893, 2024, 19 pages.

"Slippy map tilenames," Open Street Map Wiki, https://wiki.openstreetmap.org/w/w/index.php?title=Slippy_map_tilenames&oldid=2689774, 2024, 7 pages.

* cited by examiner

100

LOCALIZED RECOMMENDATION SYSTEMS BASED ON DISCOVERY RADIUS OPTIMIZATION

CROSS-REFERENCE TO RELATED APPLICATIONS

This present application claims priority to a U.S. provisional application Ser. No. 63/579,192 filed Aug. 28, 2023, the full disclosure of which is incorporated herein by reference.

BACKGROUND

Location services provide useful information on available attractions and amenities based on location. A common feature of many applications that use location services is the ability to search for content items in a set radius around the user. Traditionally, comparing distances between points at different latitudes and longitudes has required the use of the haversine formula, which can be computationally resource intensive.

SUMMARY

Many modern navigation applications, social media services, and other programs rely on location services to locate the user on a map, tag posts with location data, and connect users to attractions. Oftentimes, users desire to see locations, tagged posts, friends, or other location-associated information that are within a certain radius of their current location. The traditional method of determining such distances is based on the longitude and latitude using the haversine formula, which determines the great-circle shortest distance between two points on the Earth's surface. The action of using the haversine to compute the distances between a user's coordinates and those of many other locations can be computationally resource intensive.

There are a number of ways in which location services can be used. One approach involves tagging various real-world locations with geospatial coordinates so they can be located easily and searched for intelligently while using a navigation application ("app"). Another approach for location services is the tagging of social media posts and media items with location data. Users of a photo-sharing app, for example, may want to tag a photograph with the location it was captured at. Another potential use for location services is the tagging of users themselves with location data, allowing for other users (e.g., friends or family) to locate them. Such approaches are powered by the same location services that suffer from the inefficiencies of haversine calculations.

Accordingly, there is a need to create a more efficient implementation of location services that prioritizes computational efficiency, especially when finding locations within a prescribed radius of a given location. As described herein, an implementation of location services that uses database lookup operations, instead of the more expensive haversine calculations, would help increase the efficiency and speed in which these comparisons may be performed.

In one aspect, a computer-implemented method for a localized recommendation search based on discovery radius optimization is provided. The method includes displaying, by a computing device, a map image of a geographical area. The method also includes receiving, by the computing device and from a user, a search query. The method further includes querying, by the computing device and based on the search query, a centralized database, wherein the centralized database comprises data indicative of a plurality of tiles covering the geographical area, wherein each tile of the plurality of tiles is associated with a respective list of points of interest associated with locations within the tile, and wherein the centralized database is configured to determine a particular tile associated with the search query. The method additionally includes receiving, from the centralized database, a particular list of points of interest associated with locations within the particular tile. The method also includes displaying, by the computing device, a visual representation of the particular list of points of interest.

In a second aspect, a computer-implemented method is provided. The method includes receiving, by a remote server and from a computing device, a search query associated with a geographical area, wherein the remote server comprises a database indicative of a plurality of tiles covering the geographical area, and wherein each tile of the plurality of tiles is associated with a respective list of points of interest located within the tile. The method also includes determining, by the remote server, a particular tile associated with the search query. The method further includes determining, by the remote server, a particular list of points of interest associated with locations within the particular tile. The method also includes providing, by the remote server and to the computing device, the particular list of points of interest located within the particular tile.

In a third aspect, a computer-implemented method for generating a centralized database associating location data and tiles that cover a geographical area is provided. The method includes determining, by a computing device and for the geographical area, a plurality of tiles covering the geographical area. The method also includes receiving, by the computing device and for each tile of the plurality of tiles, geolocation data associated with one or more points of interest associated with locations within the tile. The method further includes associating, in the centralized database and for each tile of the plurality of tiles, the geolocation data with the tile. The centralized database is configured to identify, responsive to a search query, a particular tile of the plurality of tiles, and provide a particular list of points of interest associated with locations within the identified particular tile.

In a fourth aspect, a computing device for location-based search is provided. The computing device includes one or more processors and data storage. The data storage has stored thereon computer-executable instructions that, when executed by one or more processors, cause the computing device to carry out functions. The functions include any of the aforementioned computer-implemented methods.

In a fifth aspect, a computer program for location-based search is provided. The computer program includes instructions that, when executed by a computer, cause the computer to carry out functions. The functions include any of the aforementioned computer-implemented methods.

In a sixth aspect, an article of manufacture for location-based search is provided. The article of manufacture includes one or more computer readable media having computer-readable instructions stored thereon that, when executed by one or more processors of a computing device, cause the computing device to carry out functions. The functions include any of the aforementioned computer-implemented methods.

In a seventh aspect, a system for location-based search is provided. The system includes means for carrying out any of the aforementioned computer-implemented methods.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
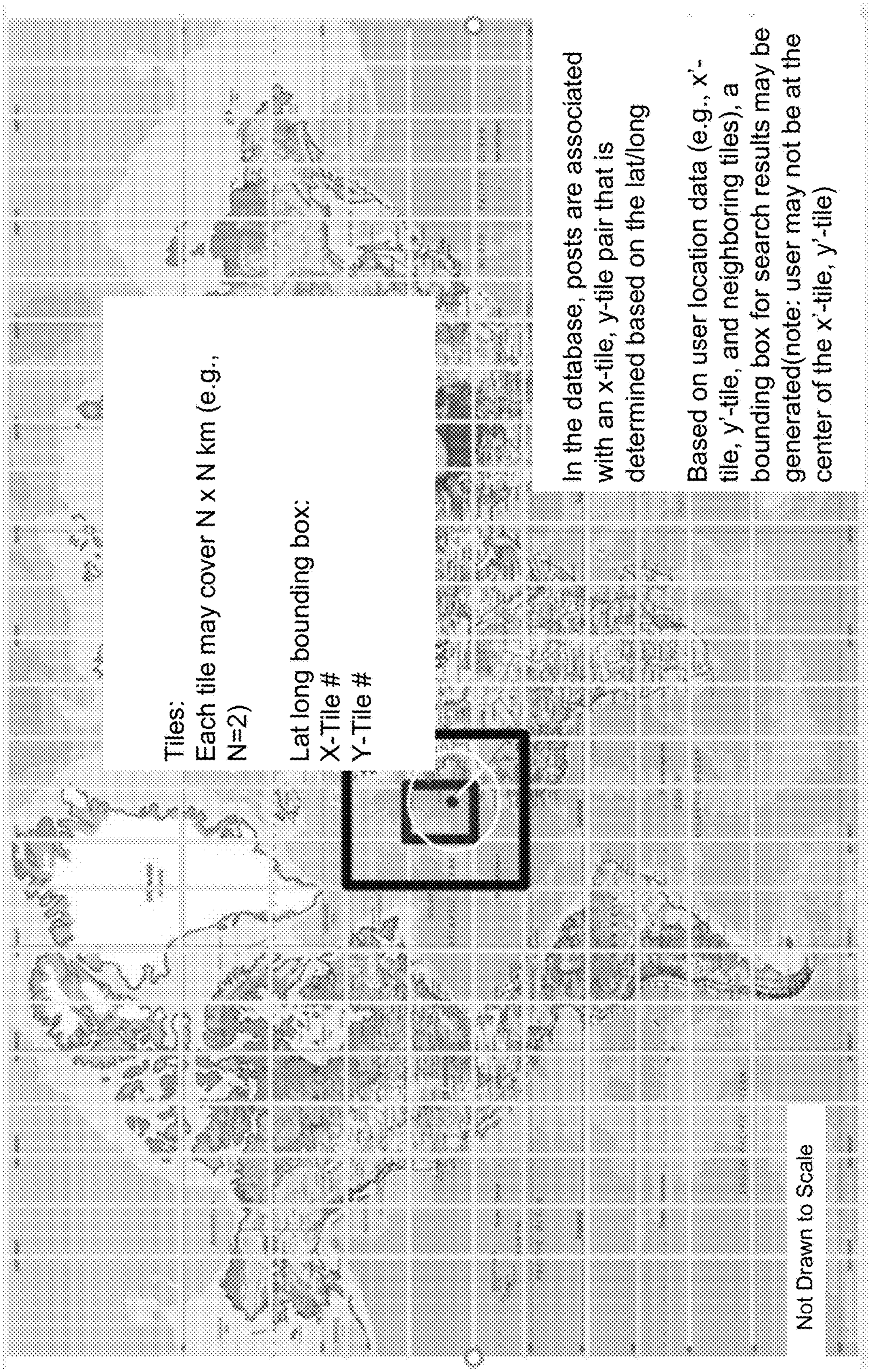
FIG. 1 is an example illustration of equally sized tiles to divide a map into searchable segments, and the use of a bounding box in response to a user query, in accordance with example embodiments.

This application relates, in one aspect, to a localized recommendation system based on discovery radius optimization.

As described herein, one approach can involve a centralized database that contains a set of tiles (e.g., polygonal figures) that divide the world map into sections. These tiles can be any size, shape, or dimension. In some embodiments, each tile of the plurality of tiles may be polygonal in shape. In some embodiments, each tile of the plurality of tiles may be a square. For purposes of illustrations, the tiles used herein will be square. The delineations of these tiles may be pre-computed using a certain formula that accounts for the curvature of the Earth ensuring they are substantially equal in area. In some embodiments, the delineations of these tiles may be determined dynamically based on a location, a user, a type of search query, and so forth. The method further includes associating locations, posts, or other content items, defined by latitude and longitude, with such tiles.

In some embodiments, the search query may include one or more of location data, search radii, or search terms. For example, another approach can involve receiving a user-inputted search radius (for example, a distance or "travel time"), and associated search terms (for example, "restaurant") into a computing device. The method then includes the localized recommendation system taking this search radius and using it to generate a bounding box around the user's current location. The method includes searching the database associating map tiles with the locations of content items and returning a list of content items whose associated tiles are within the bounding box defined by the localized recommendation system. The method then includes displaying, through the computing device, a list of locations within the search range that are relevant to the user based on the search terms inputted into the localized recommendation system. The method further includes displaying, through the computing device, a map annotated with the user's location and the locations of relevant content items tagged with location within the search range.

In some embodiments, the plurality of tiles may be determined based on a characteristic of the geographical area. For example, proximity and density of locations found in urban environments may result in an overabundance of search results. For example, many cities may include hundreds, or even thousands, of locations, tagged posts, and other geodata stored in a very small set of tiles in the database. In some embodiments, the characteristic of the geographical area may include a distribution of points of interest available within the geographical area. For example, some locations (e.g., cities) may include may more points of interest (e.g., museums, parks, statues, restaurants, theaters, etc.). In some embodiments, the characteristic of the geographical area may include a strength on an internet connection available within the geographical area. For example, areas with a strong network accessibility and/or bandwidth are likely to be easier to search. Accordingly, smaller tiles may be efficient.

As such, some tiles may be too large for the scale of many urban locations. When a user performs a search for locations within a certain radius, this fact, plus a bounding box that is too large, may lead to the localized recommendation system performing a large amount of calculations and displaying an untenably-large list of locations to the user. As such, various methods to reduce the scale of searches performed in certain urban environments are described.

In some embodiments, the characteristic of the geographical area may include a population density of the geographical area. Areas with large population densities are likely to return many more search results. Some embodiments may involve adjusting the size of the bounding box based on the user's location. A bounding box may be made smaller if the user is in a very densely populated area, where locations may be much closer together than in other areas. The method includes determining, based on pre-determined location data in the database, whether the user is in a designated urban area. The method alternatively includes determining, based on the density of location data in the database that the user is in an urban environment. The method further includes adjusting the size of the bounding box to be smaller or larger based on the location of the user, and the density of results returned by an initial search. If the number of results returned is too small or too large to be practical, the bounding box may be adjusted.

Another example approach may involve dividing the tiles into smaller-sized subunits. The method includes determining, based on pre-determined location data in the database, whether the user is in a designated urban area. The method alternatively includes determining, based on the density of location data in the database that the user is in an urban environment. The method further includes subdividing tiles in urban areas into many smaller squares. The location tags in the database would further be associated with the smaller squares of the tiles ("subtiles"). The method includes, when the user runs a search with a certain radius, only returning the subtiles within a certain radius of the user, leading to more accurate results that are closer to the user's current location.

Some embodiments involve filtering results presented to the user. The method includes associating location data in the database with feature vectors that link that data with certain categories. Examples of categories include sports, music, and food. When the bounding box is created based on the user-defined search radius, results returned to the user are filtered based on these feature vectors and the user-inputted search terms.

FIG. 1 is an example illustration of equally sized tiles to divide a map into searchable segments, and the use of a bounding box in response to a user query, in accordance with example embodiments. World map 100 represents the geography of the earth, stored in the localized recommendation system's database. Example tile 101 represents one of the tiles that divide the earth evenly into sections of equal area. The precise bounds of tiles, such as tile 101, may be determined by a certain formula due to the curvature of the earth. Bounding box 102 may be determined based on a user-inputted search radius. The maximal extent of the bounding box in each cardinal direction may be computed by assuming that the user is at a maximal location in their current tile in that direction. This is because in order to avoid haversine calculations, the system may not know exactly where the user is located within a particular tile. The bounding box includes all of the map tiles that are within this computed radius.

Figure 2A:
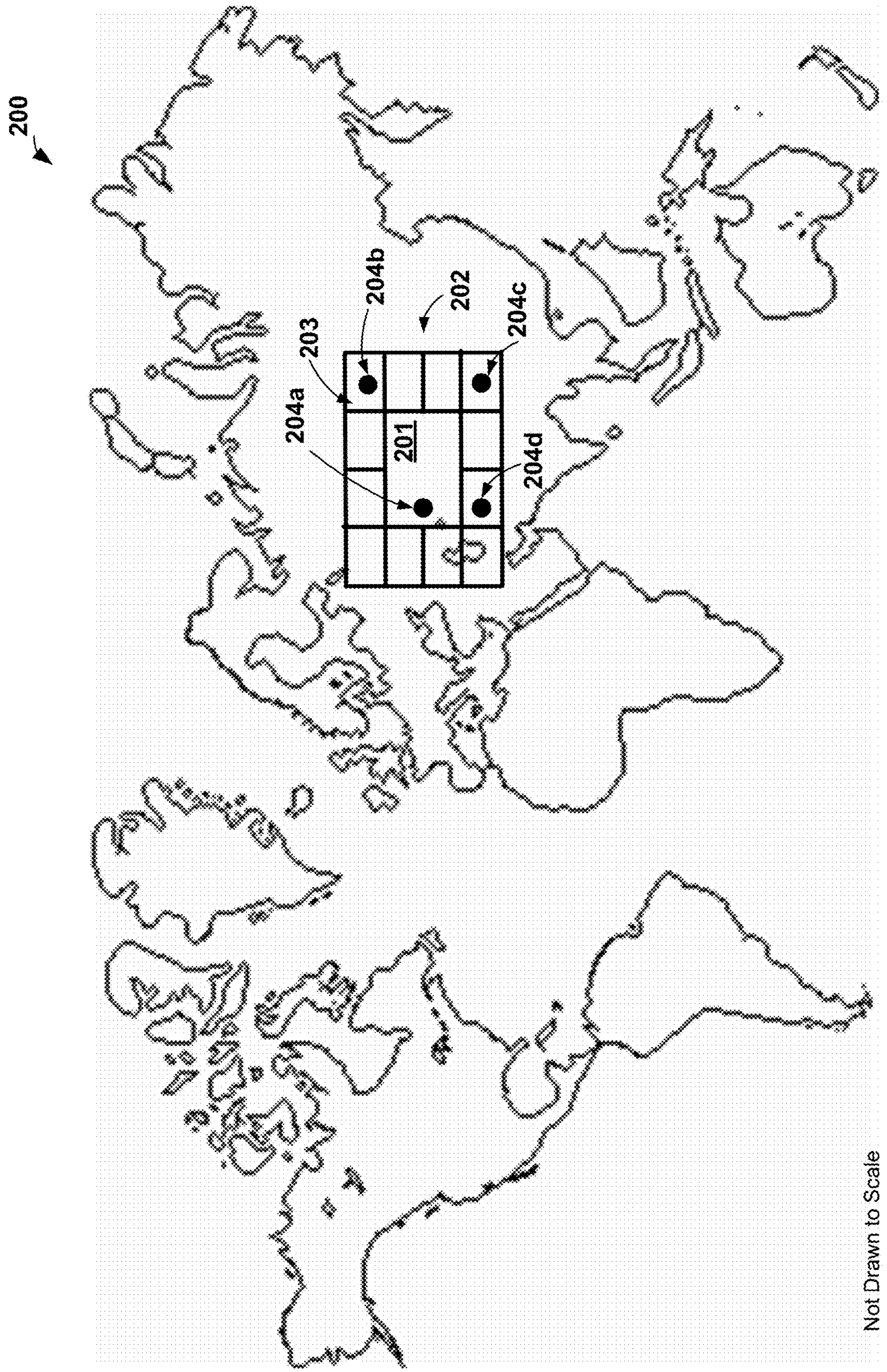
FIG. 2A illustrates the results of a user search that utilizes the localized recommendation system based on discovery radius optimization, in accordance with example embodiments.

FIG. 2A illustrates the results of a user search that utilizes the localized recommendation system based on discovery radius optimization, in accordance with example embodiments. The map 200 indicates the user's immediate surroundings. For example, a zoomed-in map can be implemented with any variation of "slippy map" implementations that allow for dynamic maps that can be zoomed in and panned. An example of a slippy map implementation that could be used for this application is that of OpenStreetMap (OSM). For illustrative purposes, the user may be located in tile 201, as determined by the latitude and longitude of the user. These coordinates may be queried in the central database of the localized recommendation system, and identified with the tile that contains them. The bounding box 202 is the bounding box determined according to the user-inputted search radius. The localized recommendation system is configured to assume that the user could be located at any position within tile 201. Therefore, the bounding box 202 may be generated to extend out of tile 201 to the maximal extent of the search radius at each edge, assuming the user was located at an edge of tile 201. Bounding box 202 includes various tiles 203 that are within the search radius. As an example, a few potential locations 204*a*, 204*b*, 204*c*, and 204*d* within these tiles 203 are highlighted in FIG. 2A. In this example search, the user did not enter additional filters to their search radius, so the locations returned are within the search radius defined by the user, and show locations that would be associated with tiles in the central database of the localized recommendation system.

Another embodiment within this scope may include a search in which the user does define additional filters to narrow down their search.

Figure 2B:
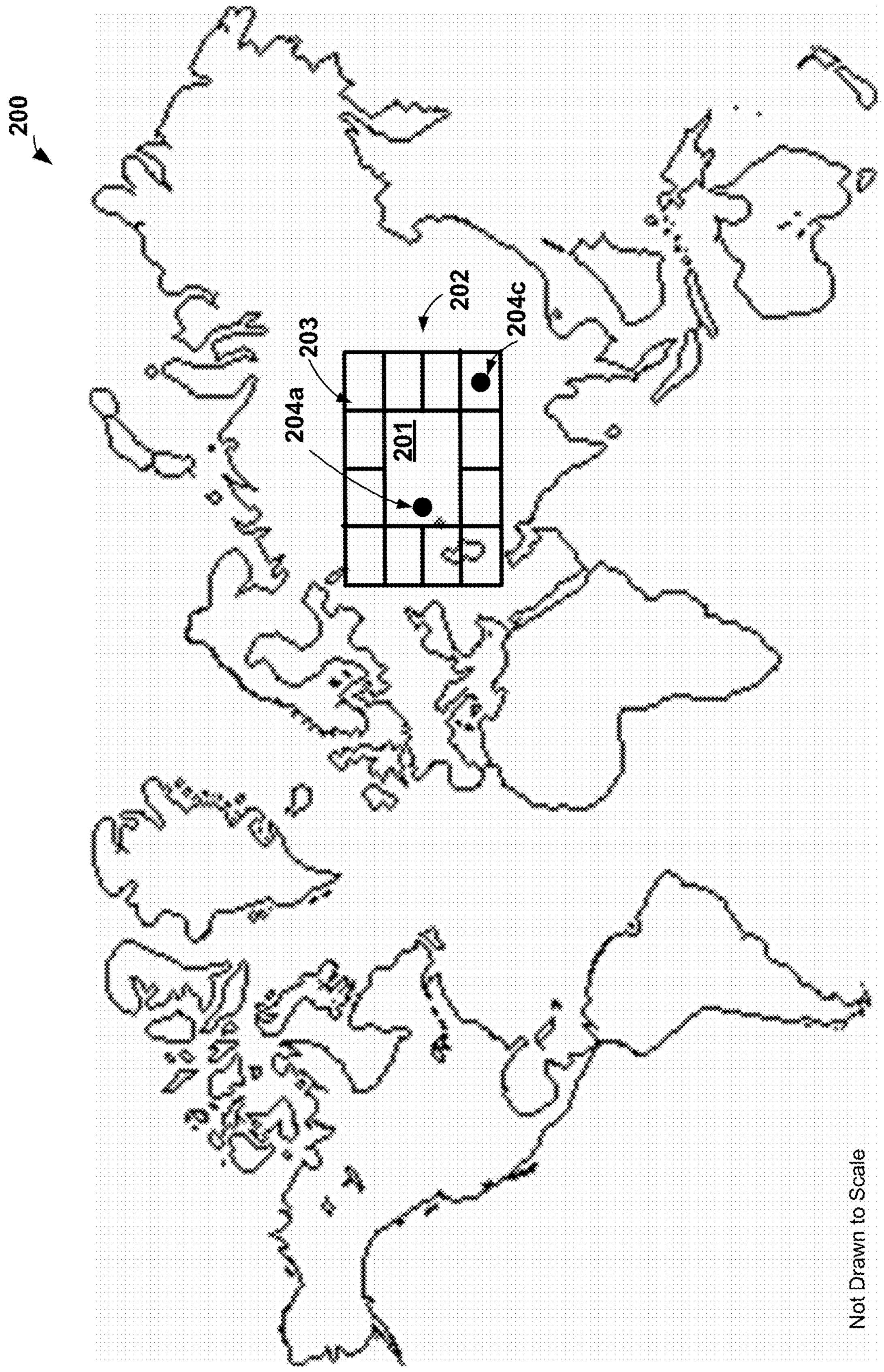
FIG. 2B illustrates another example user query, in accordance with example embodiments.

FIG. 2B illustrates another example user query, in accordance with example embodiments. For example, FIG. 2B illustrates a search where the user has added the additional search term "restaurants," but has maintained the same search radius, and is in the same location. Therefore, tile 201, bounding box 202, and tiles 203 remain unchanged from FIG. 2A. Locations 204*a* and 204*c* are visible, however, as they were tagged with additional feature vectors that marked them as restaurants, or food-related services. The localized recommendation system returns the search results relevant to the user's search terms.

Figure 3:
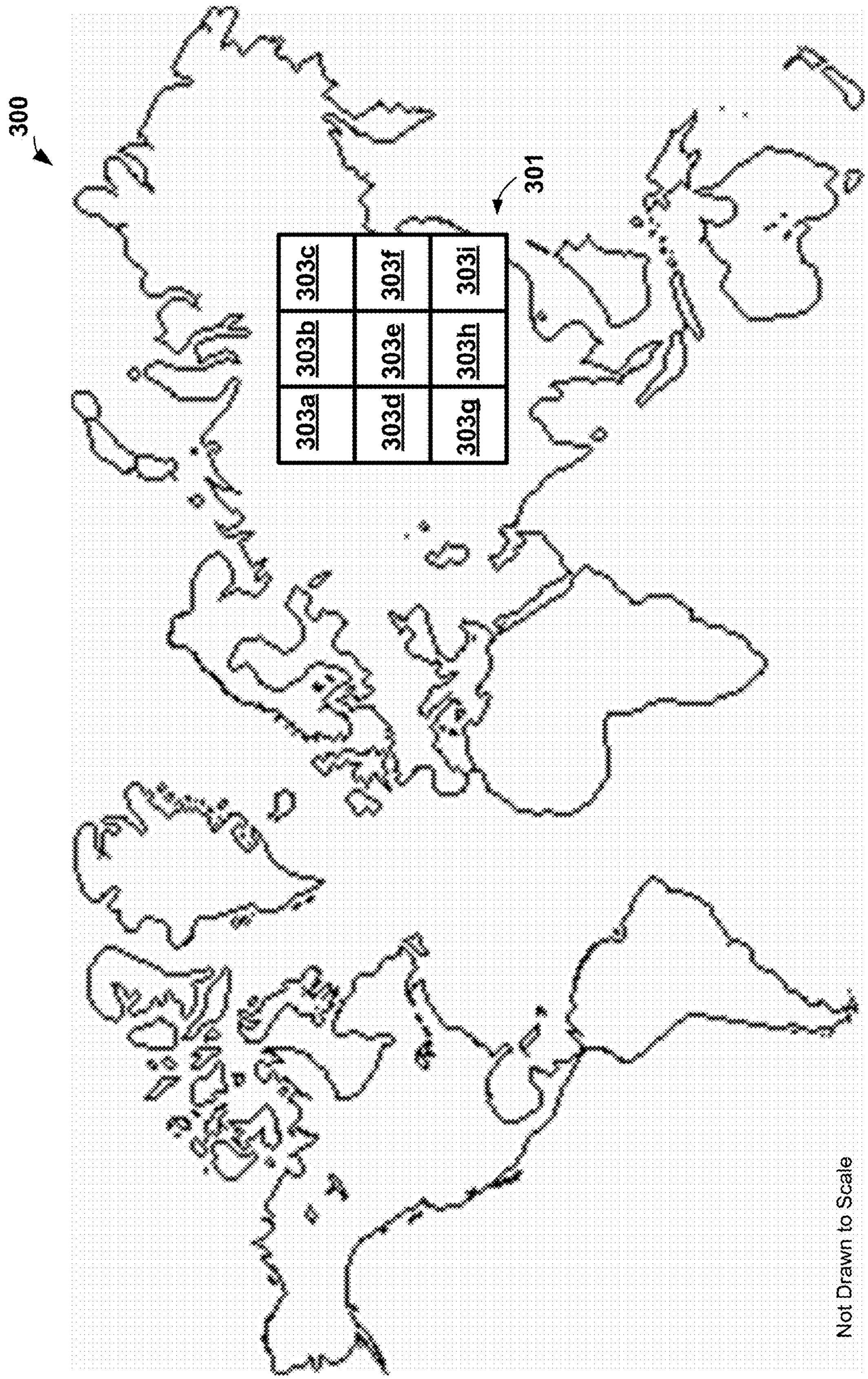
FIG. 3 illustrates an example subtiling of a tile, in accordance with example embodiments.

FIG. 3 illustrates an example subtiling of a tile, in accordance with example embodiments. For example, FIG. 3 illustrates how the divisions of the world map may be further subdivided based on the density or other qualities of the specific divisions in question. The subdivision of a single tile 301 on the world map 300 into various smaller subtiles is illustrated. These smaller subtiles may be used to provide a higher degree of accuracy and allow for smaller search radii than by using larger tiles. The smaller subtiles may be present in map tiles that are associated with urban and/or more densely populated environments, where there would be a large amount of associated location data and smaller distances between points of interest. In the example shown in FIG. 3, tile 301 is shown to be divided into 9 different smaller subtiles, 303*a-i*. This number of tiles is not restrictive, and there can be any number of subtiles within a map tile in the database for the localized recommendation system. The 9 smaller subtiles are likewise associated with location data stored in the database. Locations in the database are associated first with a tile, and then, if necessary, associated with a smaller subtile within that original tile. Generally speaking, a tile and a corresponding may have different geometrical shapes. When the user submits a search with a small bounding box (for example, smaller than the size of the tiles searched), the bounding box 302 may include subtiles, instead of a larger tile. This allows for a more accurate and smaller-scale localized search.

Example Applications

A number of example applications are now described. These examples are for illustrative purposes only, and in no way limiting the scope of the present description. A number of applications for location services powered by the localized recommendation system based on discovery radius optimization are provided. These include a user searching for restaurants near their location, a user searching for social media posts made near a location that they provide, and a user being able to see an approximate area in which another user (e.g., family member, friend, etc.) is located.

Figure 4A:
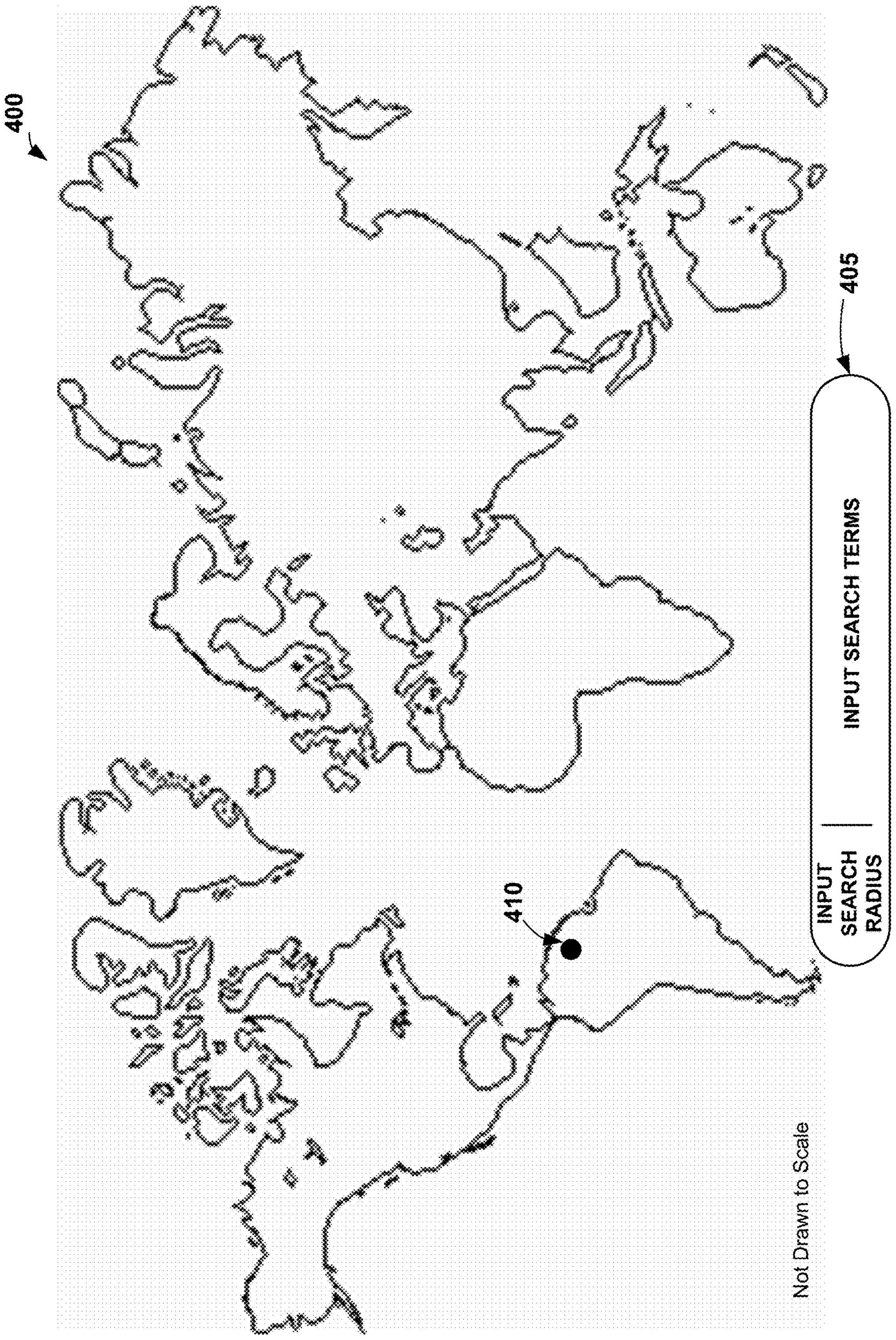
FIG. 4A illustrates an example interactive graphical user interface in a first state, in accordance with example embodiments.

FIG. 4A illustrates an example interactive graphical user interface in a first state, in accordance with example embodiments. For example, FIG. 4A illustrates an example interactive graphical user interface for design specifications. Computing device 600 of FIG. 6 may include an interactive graphical user interface (GUI) that displays a map 400 of the user's surroundings. Annotated on the map 400 is the user's location 410. Computing device 600 may include a method of user input, such as a touch display, gesture, mouse, keyboard, voice input, or any other method of conveying input to the computing device 600. Computing device 600 may display a search panel 405 under the map 400. This search panel 405 can accept a language based query as well as a defined search radius provided by the user.

Figure 4B:
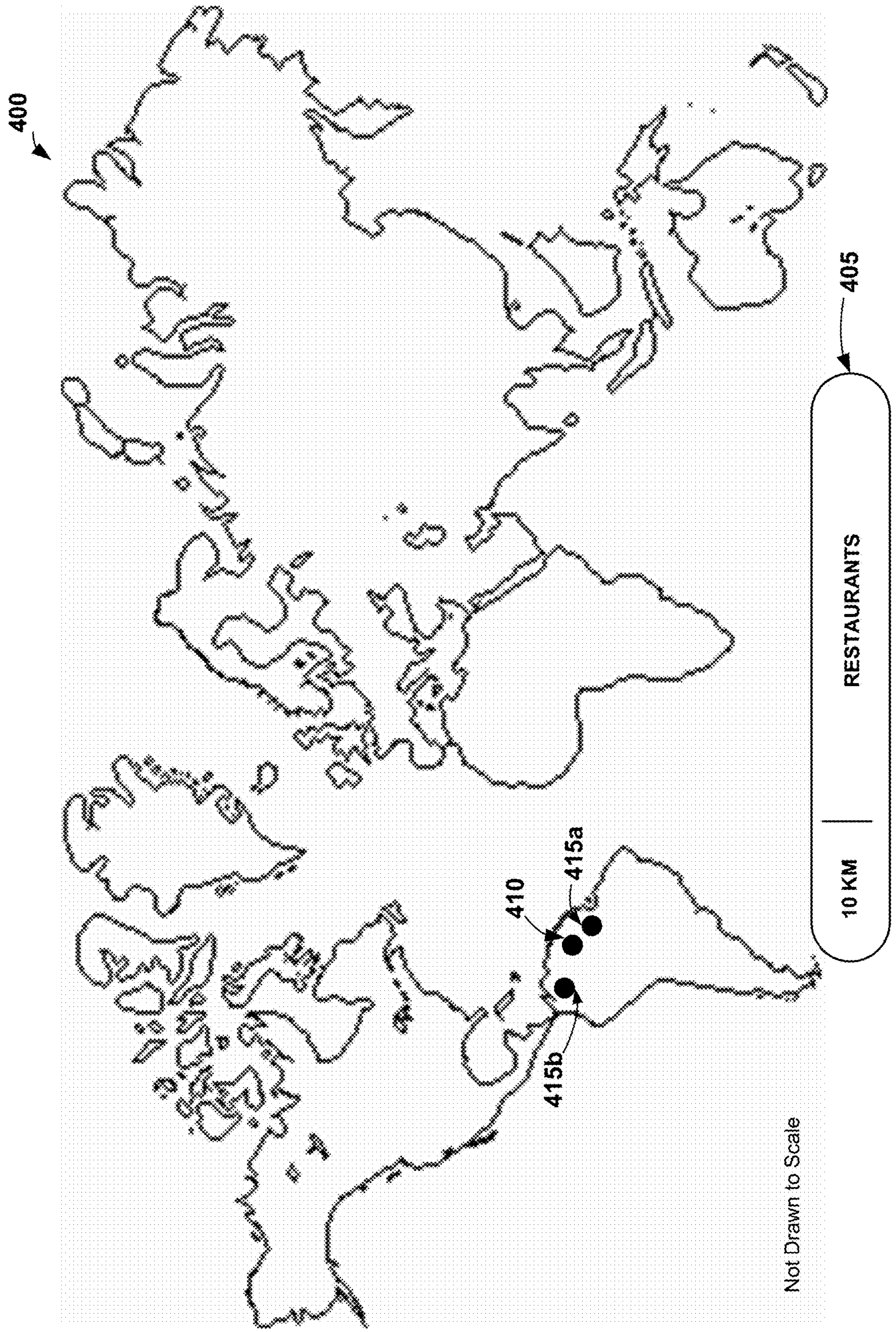
FIG. 4B illustrates an example interactive graphical user interface in a second state, in accordance with example embodiments.

FIG. 4B illustrates an example interactive graphical user interface in a second state, in accordance with example embodiments. For example, FIG. 4B illustrates an example interactive graphical user interface for design specifications. FIG. 4B displays the results on the graphical user interface after a user has input a search in search panel 405 for "restaurants" within a certain number of kilometers (e.g., 10 km) of their current position. The localized recommendation system may generate and display a bounding box that includes the tiles within that search radius based on the user's possible positions within the tile. The localized recommendation system may filter the results based on the user's request for restaurants, and return the results via the graphical user interface. The example graphical user interface may display the relevant results 415*a* and 415*b* as pins on the map 400 of the user's surroundings.

FIG. 4B can also be used to illustrate searching a user-specified location for social media photo posts taken within a certain radius of that location. In this scenario the user may specify the location to be searched in search panel 405, alongside a specific search radius. The localized recommendation system may pan map 400 to the surrounding area of the location specified by the user (which may be, but may not necessarily be, where the user is located). The search query may be directed to the localized recommendation system, which would search the database for the social media posts or other content items associated with tiles within the bounding box of the user's search. The localized recommendation system may display pins to indicate the relevant results 415*a* and 415*b* on the map 400.

Figure 4C:
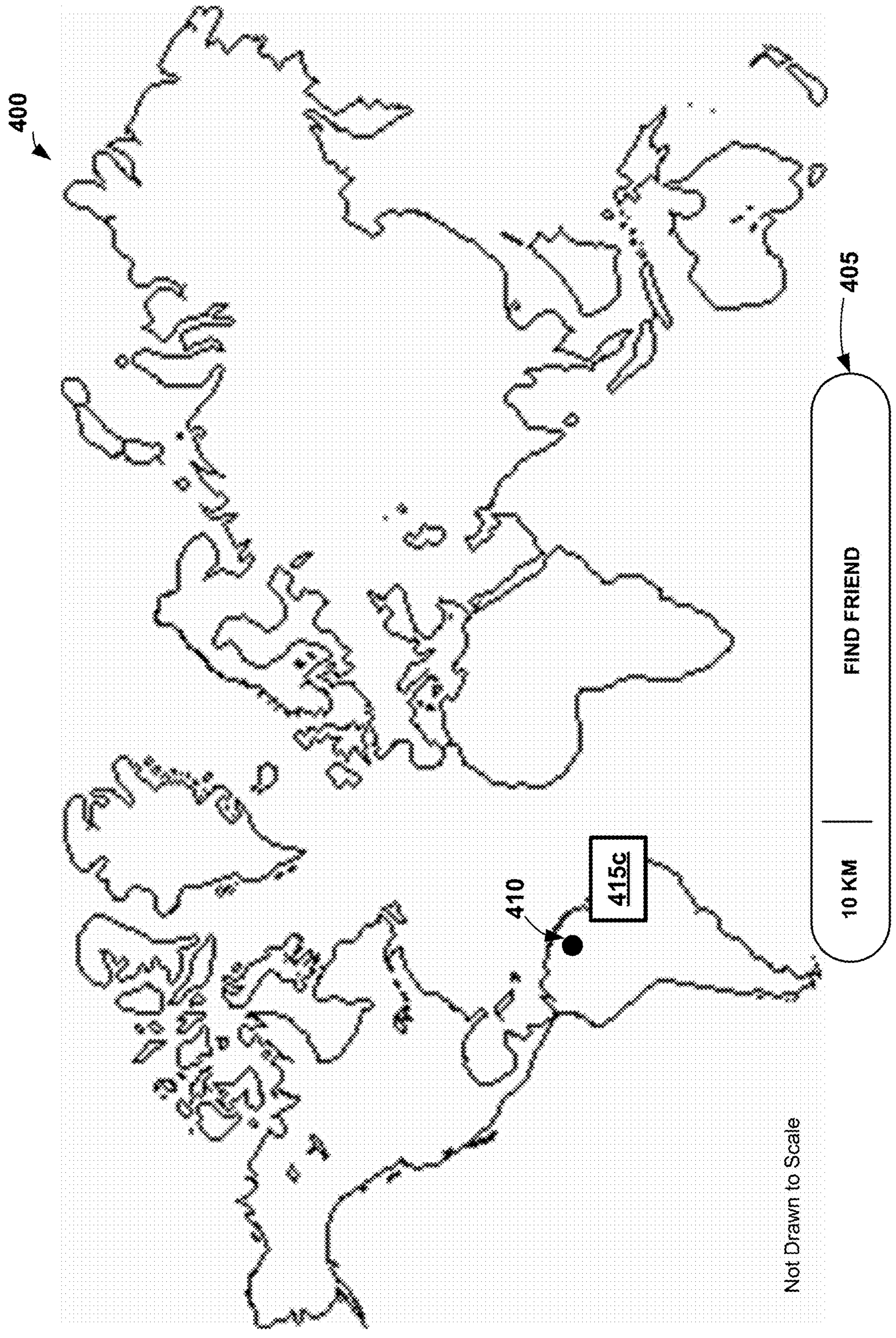
FIG. 4C illustrates an example interactive graphical user interface in a third state, in accordance with example embodiments.

FIG. 4C illustrates an example interactive graphical user interface in a third state, in accordance with example embodiments. For example, FIG. 4C illustrates an example use of the localized recommendation system to provide a user an approximate location of their social media friends and/or family members. A common use of navigational and social media applications that utilize location services is a triangulation of other users in relation to the primary user. An example of this is a commonly-used location feature on various mobile devices, which allows a user to see the locations of their devices and the devices of family members and/or friends in real-time. For security and privacy reasons, many users might wish that their exact locations were not visible to others. By utilizing the tiles of the localized recommendation system, it is possible to provide a user with a privacy enhanced approximate location of another user or locations of multiple users without compromising their exact location.

In FIG. 4C, computing device 600 displays a map 400 of the user's surroundings. The user's location 410 may be displayed on map 400. In the search panel 405, the user may input the name of one of their contacts to search their location. The localized recommendation system finds the contact's location by identifying the tile associated with the contact. Instead of providing a precise location, the computing device 600 may display the tile outline 415*c* on the map 400, providing the user with an approximate location for the contact, while maintaining the privacy for the contact.

Example Data Network

Figure 5:
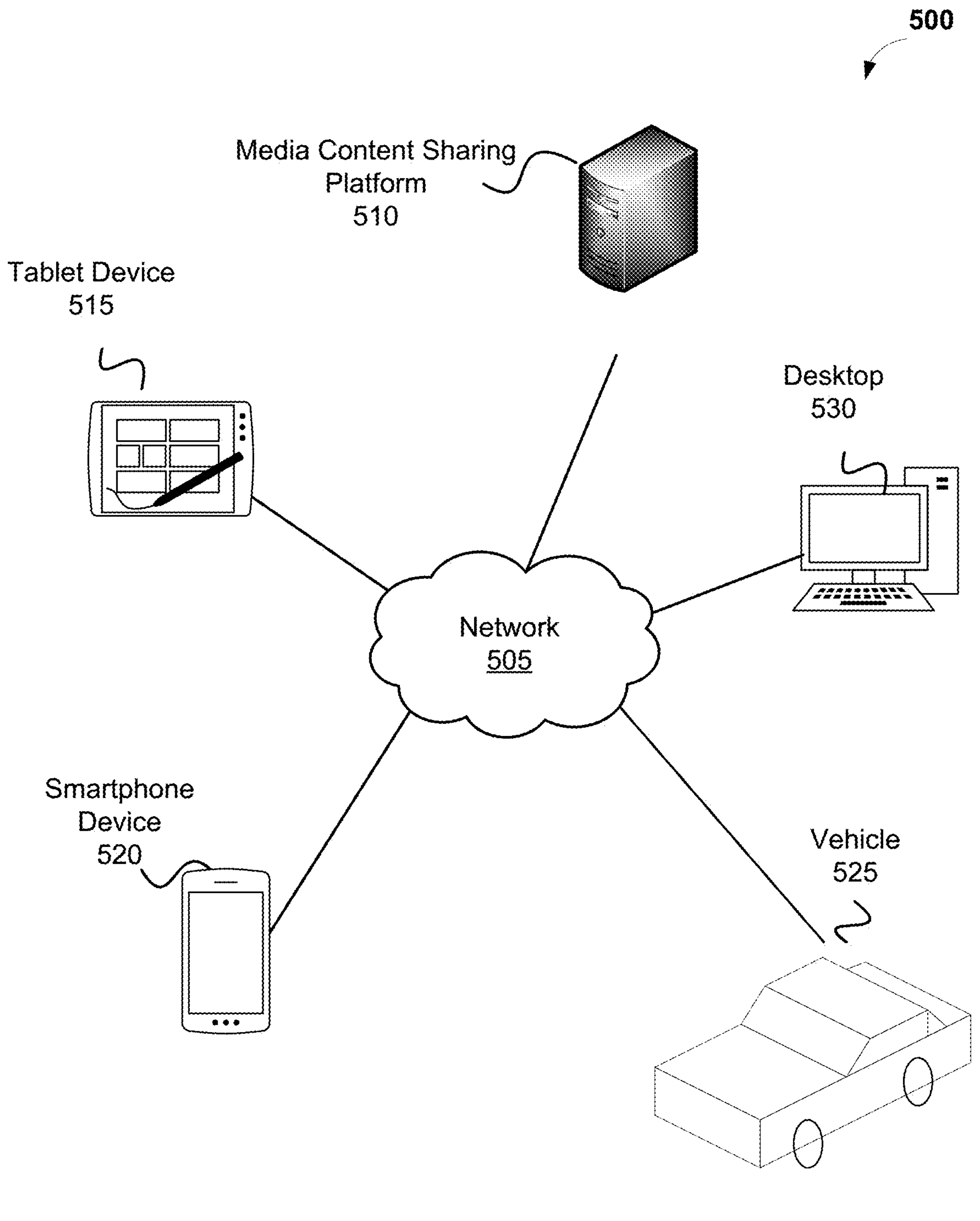
FIG. 5 depicts a distributed computing environment, in accordance with example embodiments.

FIG. 5 depicts a distributed computing environment 500, in accordance with example embodiments. Distributed computing environment 500 includes a media content sharing platform 510 (e.g., a server device, a distributed system, a hybrid cloud, a cloud server, and so forth) that is configured to communicate, via network 505, with one or more computing devices, such as a tablet device 515, a smartphone device 520, a vehicle 525 equipped with a computing device, and a desktop. Network 505 may correspond to a local area network (LAN), a wide area network (WAN), a WLAN, a WWAN, an intranet, a public Internet, or any other type of network configured to provide a communications path between networked computing devices. Network 505 may also correspond to a combination of one or more networks.

It may be noted that these devices shown are for illustrative purposes only. Generally speaking, media content sharing platform 510 may be communicatively linked to a computing device over network 505. In fact, it may be linked to multiple computing devices (e.g., millions) in distributed computing environment 500. In addition to the computing devices illustrated in FIG. 5, other devices such as mobile computing devices, wearable devices, head-mountable devices (HMD), AR devices, VR devices, aircrafts, boats, drones, and so on are possible. The devices may be directly connected to network 505, or may be indirectly connected to network 505 via another device that is directly connected.

Example Computing Device

Figure 6:
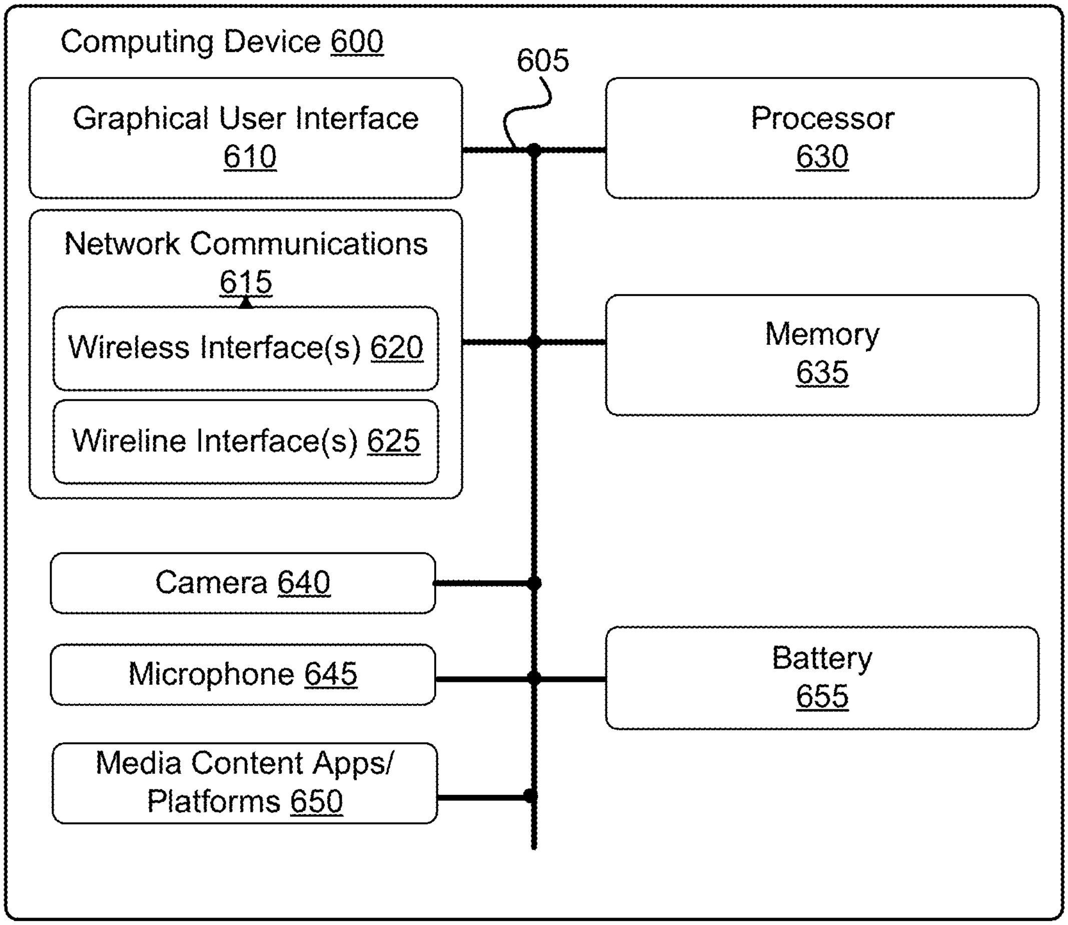
FIG. 6 is a block diagram of an example computing device, in accordance with example embodiments.

FIG. 6 is a block diagram of an example computing device 600, in accordance with example embodiments. In particular, computing device 600 shown in FIG. 6 can be configured to perform at least one function of and/or related to localized search, methods 700, 800, and/or 900.

Computing device 600 may include modules to provide various functionalities, such as for example, a graphical user interface 610, network communications 615, a processor 630, memory 635, a camera 640, a microphone 645, and battery 655, all of which may be linked together via a system bus, or other connection mechanism 605.

Graphical user interface 610 can be configured to send data to and/or receive data from external user input/output devices such as such as a touch screen, a computer mouse, a keyboard, a microphone, external monitors, and the like. Graphical user interface 610 can also be configured to generate audio and/or video outputs.

Network communications 615 can be configured to provide one or more wireless interface(s) 620 and/or one or more wireline interface(s) 625 that can be configured to communicate via a network (e.g., network 505 of FIG. 5). Wireless interface(s) 620 can include wireless transmitters, receivers, and/or transceivers (e.g., for Bluetooth, Wi-Fi, near-field communications, etc.). Wireline interface(s) 625 can include wireline transmitters, receivers, and/or transceivers (e.g., Ethernet transceiver).

In some examples, network communications 615 can be configured to provide reliable, secured, and/or authenticated communications. For example, network communications 615 can be configured to provide encrypted data. The type of encryption may depend on a type of network interface, capabilities of a network itself, a type of data to be transmitted, and so forth.

Processor 630 can include a general purpose processor, and/or special purpose processors (e.g., digital signal processors, graphics processing units (GPUs), media processing processors, image processing processors, text processing processors, speech processing processors, etc.). Processor 630 can be configured to execute computer-readable instructions that are contained in memory 635 and/or other instructions as described herein.

Memory 635 can include one or more non-transitory computer-readable storage media that can be read and/or accessed by processor 630. The one or more computer-readable storage media can include volatile and/or non-volatile storage components. In some examples, memory 635 can be implemented using a single physical device, while in other examples, memory 635 can be implemented using multiple physical devices.

Memory 635 can include computer-readable instructions that, when executed by processor 630, enable computing device 600 to provide for some or all of the functionality of the computing devices and/or media content sharing platforms described herein.

In some examples, computing device 600 can include camera 640. Camera 640 can include still and/or video cameras.

In some examples, computing device 600 can include microphone 645. Microphone 645 can be configured to capture audio inputs (e.g., speech, music, and so forth).

In some examples, computing device 600 can include media content apps/platforms 650. Media content apps/platforms 650 may be configured to share media content, enable recording or playback of shared media content, create and/or share annotated images as described herein.

Battery 655 is configured to provide electrical power to computing device 600. Each battery can, when electrically coupled to the computing device 600, act as a source of stored electrical power for computing device 600. Battery 655 may be one or more of portable, removable, rechargeable, etc. The term battery is generally used herein to denote a power supply (wired or otherwise).

Example Methods of Operation

Figure 7:
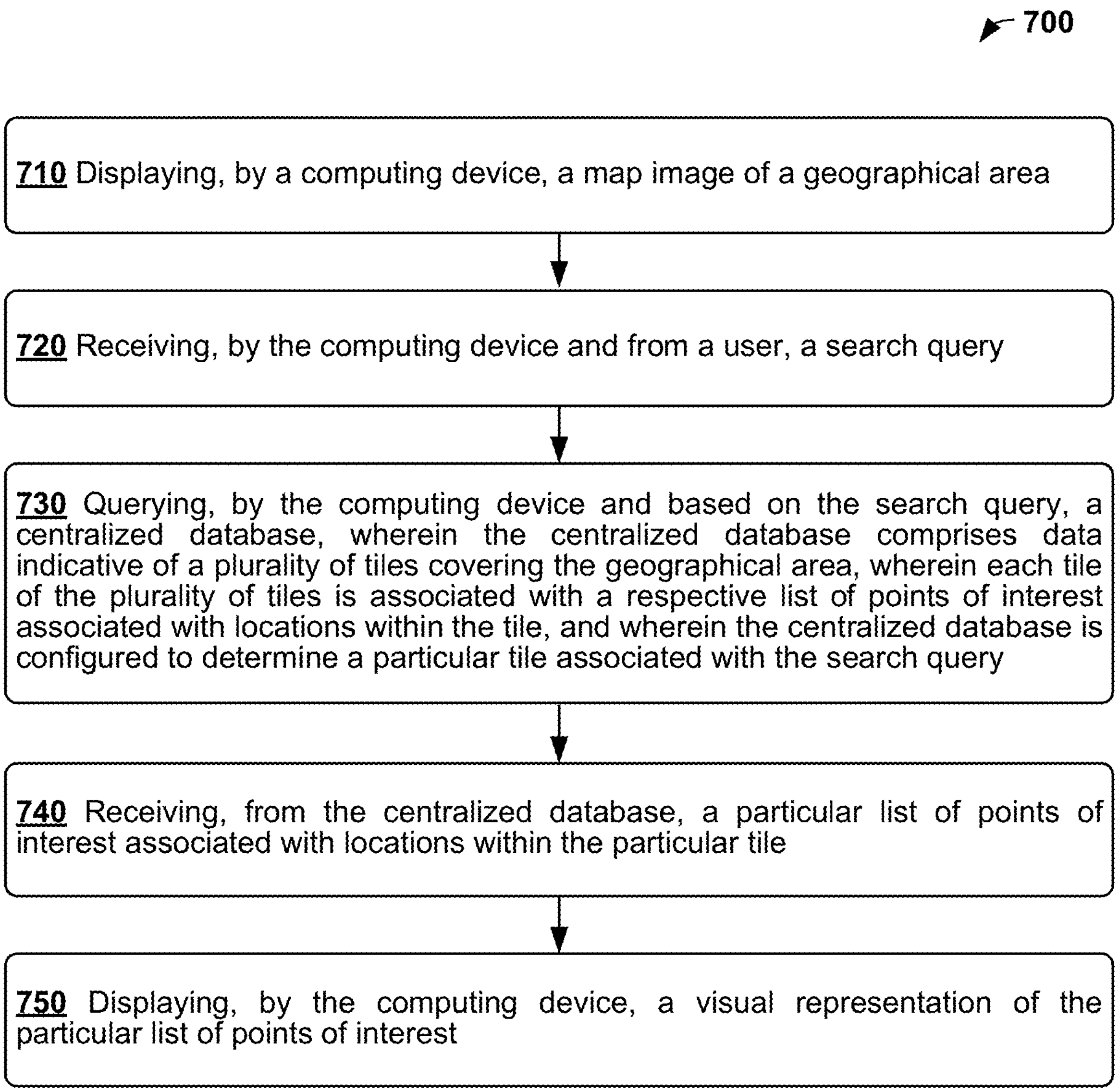
FIG. 7 is a flowchart of a method for implementing a localized recommendation system based on discovery radius optimization, in accordance with example embodiments.

FIG. 7 is a flowchart of a method for implementing a localized recommendation system based on discovery radius optimization, in accordance with example embodiments. Method 700 can be executed by a computing device, such as computing device 600. Method 700 can begin at block 710, where method 700 involves displaying, by a computing device, a map image of a geographical area.

At block 720, method 700 involves receiving, by the computing device and from a user, a search query.

At block 730, method 700 involves querying, by the computing device and based on the search query, a centralized database, wherein the centralized database comprises data indicative of a plurality of tiles covering the geographical area, wherein each tile of the plurality of tiles is associated with a respective list of points of interest associated with locations within the tile, and wherein the centralized database is configured to determine a particular tile associated with the search query.

At block 740, method 700 involves receiving, from the centralized database, a particular list of points of interest associated with locations within the particular tile.

At block 750, method 700 involves displaying, by the computing device, a visual representation of the particular list of points of interest.

In some embodiments, the search query may include a user search radius.

In some embodiments, the search radius may not be provided by the user.

In some embodiments, the search radius may be a default search radius coded into the centralized database.

In some embodiments, the search query may include one or more search terms associated with a user search radius. Some embodiments involve receiving, by the computing device, the one or more search terms.

In some embodiments, the one or more search terms may be provided by the user.

In some embodiments, the receiving of the particular list of points of interest may include receiving a filtered list of points of interest.

In some embodiments, the centralized database may be remote to the computing device.

In some embodiments, the computing device may store a local copy of at least a portion of the centralized database.

In some embodiments, the local copy may be used by the computing device in an absence of an internet connection.

In some embodiments, each tile of the plurality of tiles may be polygonal in shape.

In some embodiments, each tile of the plurality of tiles may be a square.

In some embodiments, the plurality of tiles may be determined based on a characteristic of the geographical area.

In some embodiments, the characteristic of the geographical area may include a population density of the geographical area.

In some embodiments, the characteristic of the geographical area may include a distribution of points of interest available within the geographical area.

In some embodiments, the characteristic of the geographical area may include a strength on an internet connection available within the geographical area.

In some embodiments, the search query may include one or more of location data, search radii, or search terms.

Figure 8:
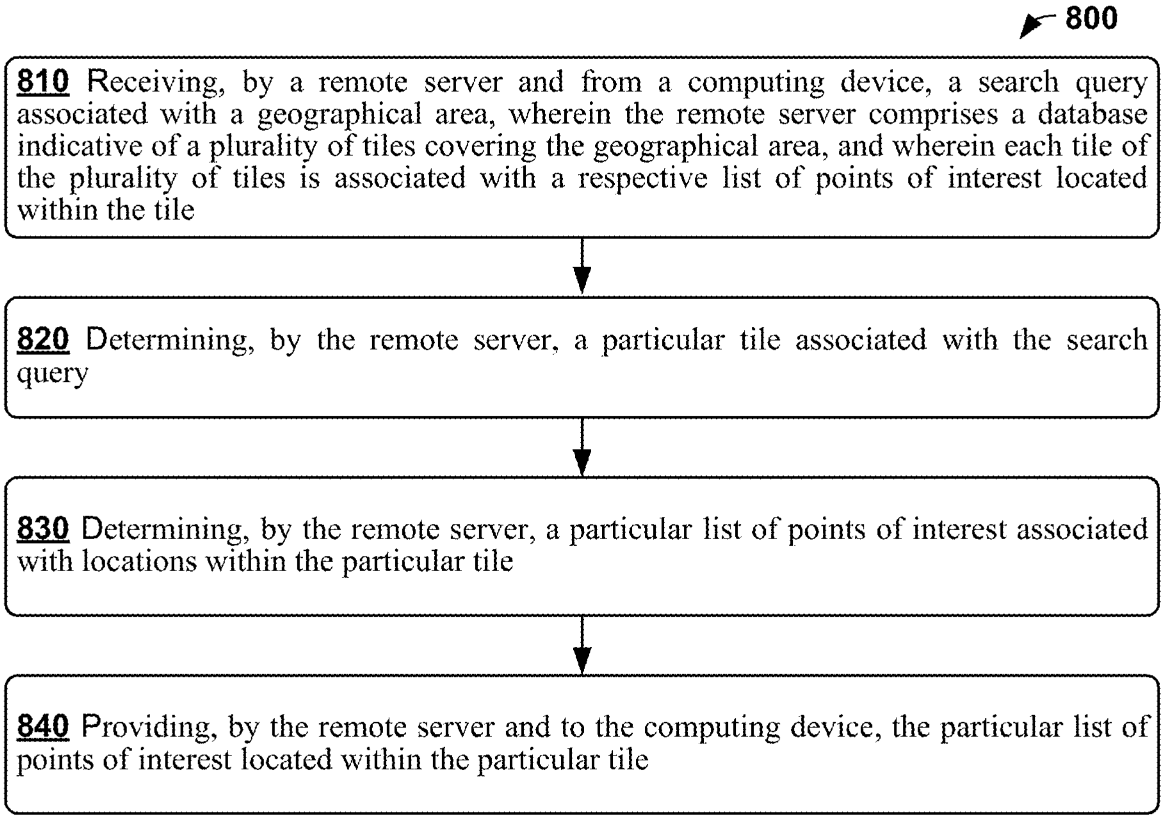
FIG. 8 is another flowchart of a method, in accordance with example embodiments.

FIG. 8 is another flowchart of a method, in accordance with example embodiments. Method 800 can be executed by a computing device, such as computing device 600. Method 800 can begin at block 810, where method 800 involves receiving, by a remote server and from a computing device, a search query associated with a geographical area, wherein the remote server comprises a database indicative of a plurality of tiles covering the geographical area, and wherein each tile of the plurality of tiles is associated with a respective list of points of interest located within the tile.

At block 820, method 800 involves determining, by the remote server, a particular tile associated with the search query.

At block 830, method 800 involves determining, by the remote server, a particular list of points of interest associated with locations within the particular tile.

At block 840, method 800 involves providing, by the remote server and to the computing device, the particular list of points of interest located within the particular tile.

Figure 9:
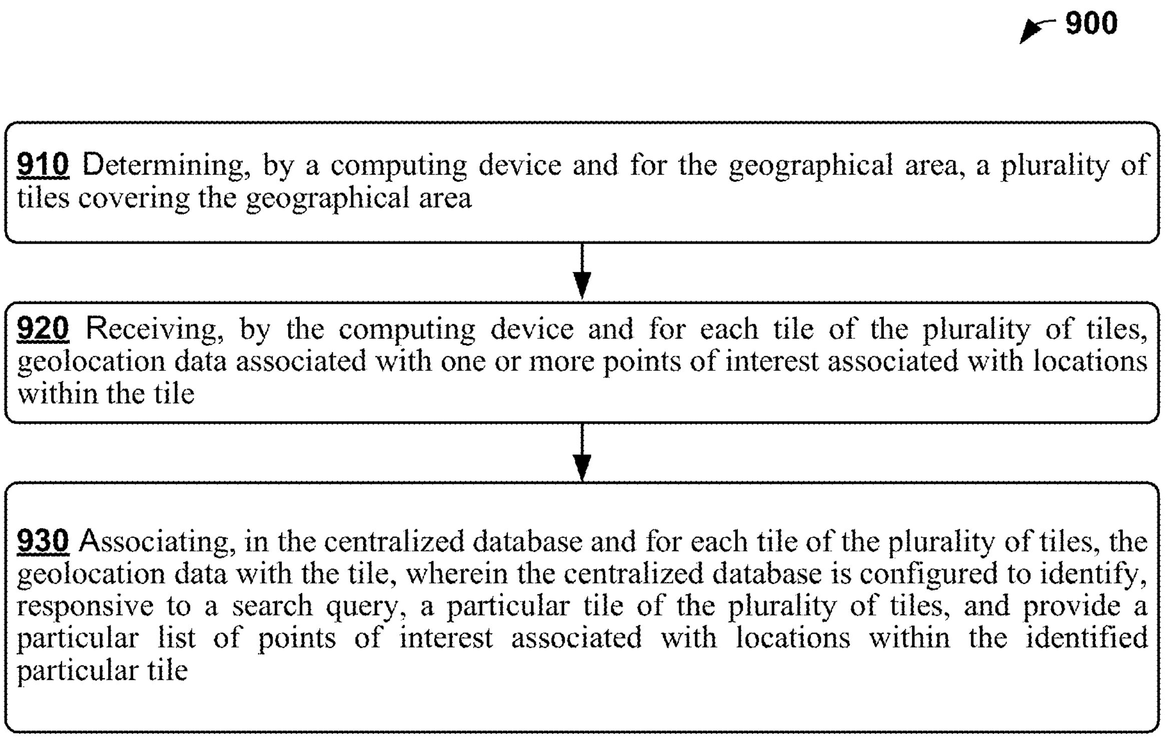
FIG. 9 is a flowchart of a method for generating a centralized database associating location data and tiles that cover a geographical area, in accordance with example embodiments.

FIG. 9 is a flowchart of a method for generating a centralized database associating location data and tiles that cover a geographical area, in accordance with example embodiments. Method 900 can be executed by a computing device, such as computing device 600. Method 900 can begin at block 910, where method 900 involves determining, by a computing device and for the geographical area, a plurality of tiles covering the geographical area.

At block 920, method 900 involves receiving, by the computing device and for each tile of the plurality of tiles, geolocation data associated with one or more points of interest associated with locations within the tile.

At block 930, method 900 involves associating, in the centralized database and for each tile of the plurality of tiles, the geolocation data with the tile, wherein the centralized database is configured to identify, responsive to a search query, a particular tile of the plurality of tiles, and provide a particular list of points of interest associated with locations within the identified particular tile.

What is claimed is:

1. A computer-implemented method for improving localized recommendation search based on discovery radius optimization, comprising:

displaying, by a computing device, a map image of a geographical area;

receiving, by the computing device and from a user, a search query comprising user location within a current tile of a plurality of tiles covering the geographical area, and wherein a search radius is associated with the search query;

querying, by the computing device and based on the search query, a centralized database, wherein the centralized database comprises data indicative of the plurality of tiles covering the geographical area, wherein each tile of the plurality of tiles is associated with a respective list of points of interest associated with locations within the tile, and wherein the querying triggers the discovery radius optimization at the centralized database, the optimization comprising:

determining a bounding box based on the user location and the search radius, wherein the determining of the bounding box comprises locating a plurality of points along edges of the current tile and extending out of the current tile to a maximal extent of the search radius in each cardinal direction, thereby increasing computational efficiency by enabling database lookup operations in lieu of haversine distance calculations, determining a subset of the plurality of tiles comprising the current tile and one or more neighbouring tiles of the plurality of tiles that fall within the determined bounding box, retrieving, from the centralized database, one or more pre-associated lists of points of interest stored in association with each tile of the determined subset; and displaying, by the computing device and based on the discovery radius optimization, a visual representation of the retrieved one or more lists of points of interest.

2. The method of claim 1, wherein the search radius is a system-generated search radius, and wherein the querying of the centralized database is based on the system-generated search radius.

3. The method of claim 1, wherein the search radius is a default search radius coded into the centralized database.

4. The method of claim 1, wherein the search query comprises one or more search terms associated with respective search radii.

5. The method of claim 4, further comprising:

receiving, by the computing device, the one or more search terms.

6. The method of claim 5, wherein the one or more search terms are provided by the user.

7. The method of claim 1, wherein the retrieving of the the one or more pre-associated lists of points of interest comprises retrieving filtered lists of points of interest.

8. The method of claim 1, wherein the centralized database is remote to the computing device.

9. The method of claim 1, wherein the computing device stores a local copy of at least a portion of the centralized database.

10. The method of claim 9, wherein the local copy is used by the computing device in an absence of an internet connection.

11. The method of claim 1, wherein each tile of the plurality of tiles is polygonal in shape.

12. The method of claim 1, wherein each tile of the plurality of tiles is a square.

13. The method of claim 1, wherein the plurality of tiles is determined based on a characteristic of the geographical area.

14. The method of claim 13, wherein the characteristic of the geographical area comprises a population density of the geographical area.

15. The method of claim 13, wherein the characteristic of the geographical area comprises a distribution of points of interest available within the geographical area.

16. The method of claim 13, wherein the characteristic of the geographical area comprises a strength of an internet connection available within the geographical area.

17. The method of claim 1, wherein the search query comprises one or more of location data, search radii, or search terms.

18. The method of claim 1, wherein the search radius is input by the user, and wherein the querying of the centralized database is based on the user-input search radius.

19. A computer-implemented method for improving localized recommendation search based on discovery radius optimization, comprising:

receiving, by a remote server and from a computing device, a search query associated with a geographical area, wherein the remote server comprises a database indicative of a plurality of tiles covering the geographical area, wherein each tile of the plurality of tiles is associated with a respective list of points of interest located within the tile, and wherein the search query comprises a user location within a current tile of the plurality of tiles, and a search radius, and causes the remote server to perform discovery radius optimization by:

determining a bounding box based on the user location and the search radius, wherein the determining of the bounding box comprises locating a plurality of points along edges of the current tile and extending out of the current tile to a maximal extent of the search radius in each cardinal direction, thereby increasing computational efficiency by enabling database lookup operations in lieu of haversine distance calculations, determining a subset of the plurality of tiles comprising the current tile and one or more neighbouring tiles of the plurality of tiles that fall within the determined bounding box, retrieving, from the database, one or more pre-associated lists of points of interest stored in association with each tile of the determined subset, and providing, by the remote server and to the computing device and based on the discovery radius optimization, the retrieved one or more lists of points of interest.

20. A computer-implemented method for generating a centralized database associating location data and tiles that cover a geographical area for improved localized recommendation search based on discovery radius optimization, comprising:

determining, by a computing device and for the geographical area, a plurality of tiles covering the geographical area;

receiving, by the computing device and for each tile of the plurality of tiles, geolocation data associated with one or more points of interest associated with locations within the tile; and associating, in the centralized database and for each tile of the plurality of tiles, the geolocation data with the tile, and wherein the centralized database is configured to, responsive to a search query comprising a user location within a current tile of the plurality of tiles covering the geographical area, and a search radius, perform the discovery radius optimization, the optimization comprising:

determining a bounding box based on the user location and the search radius, wherein the determining of the bounding box comprises locating a plurality of points along edges of the current tile and extending out of the current tile to a maximal extent of the search radius in each cardinal direction, thereby increasing computational efficiency by enabling database lookup operations in lieu of haversine distance calculations, determining a subset of the plurality of tiles comprising the current tile and one or more neighbouring tiles of the plurality of tiles that fall within the determined bounding box, retrieving one or more pre-associated lists of points of interest stored in association with each tile of the determined subset, and providing, based on the discovery radius optimization, a visual representation of the retrieved one or more lists of points of interest.

* * * * *